Nov. 5, 1968   P. A. MUTCHLER   3,408,999
LIQUID-FIRED COOKING APPARATUS
Filed May 4, 1967   2 Sheets-Sheet 1
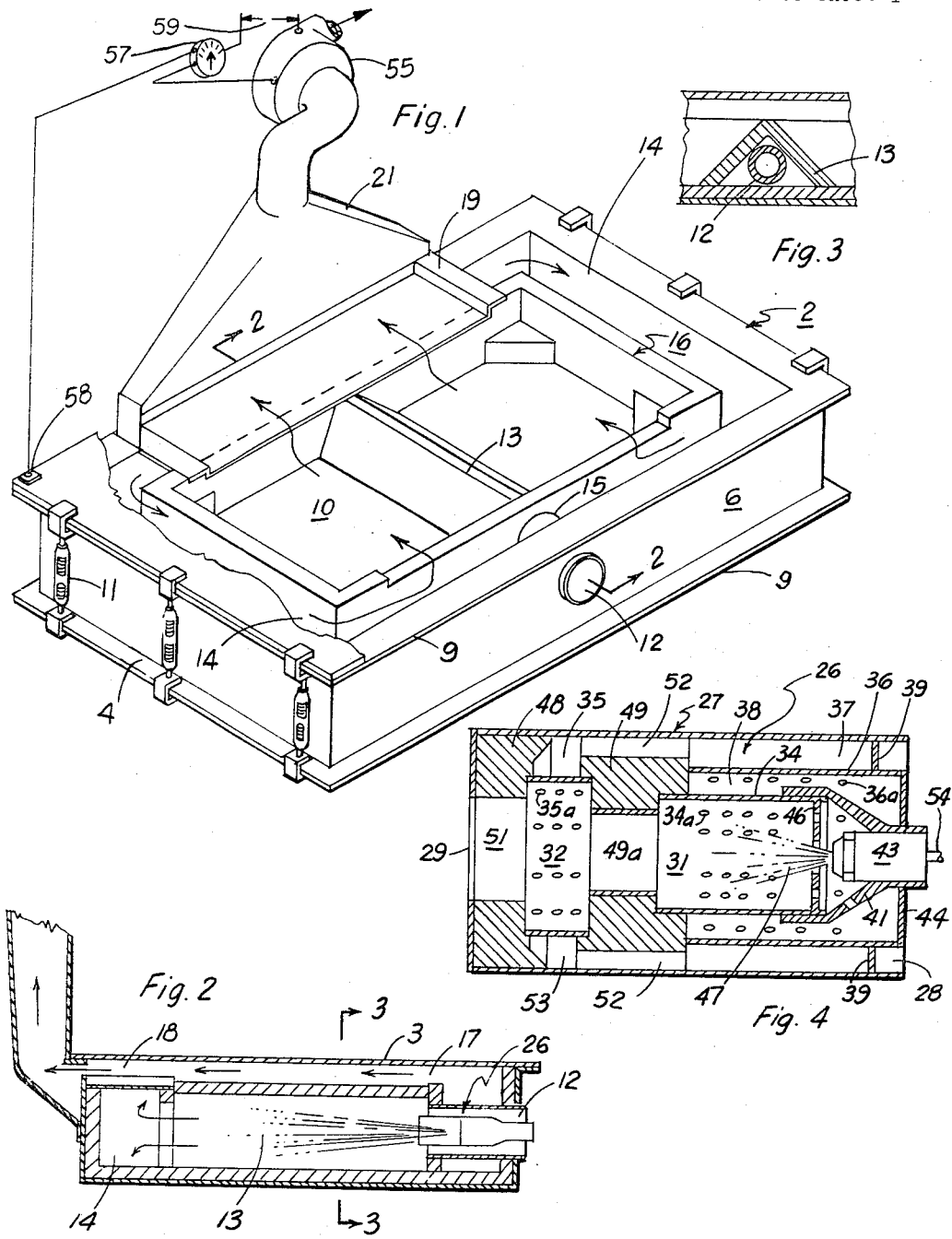
INVENTOR.
Paul A. Mutchler
BY
Ralph B. Brick Nov. 5, 1968   P. A. MUTCHLER   3,408,999
LIQUID-FIRED COOKING APPARATUS
Filed May 4, 1967   2 Sheets-Sheet 2

INVENTOR.
Paul A. Mutchler
BY
Ralph B. Brick

United States Patent Office 3,408,999
Patented Nov. 5, 1968

3,408,999
LIQUID-FIRED COOKING APPARATUS
Paul A. Mutchler, University City, St. Louis, Mo., assignor to American Air Filter Company, Inc., Louisville, Ky., a corporation of Delaware
Continuation-in-part of applications Ser. No. 557,493, June 14, 1966, and Ser. No. 620,001, Mar. 2, 1967. This application May 4, 1967, Ser. No. 636,170
7 Claims. (Cl. 126—44)

ABSTRACT OF THE DISCLOSURE

A cooking apparatus adapted to burn liquid fuel including a gas distribution arrangement for a cooking surface which applies heat along the peripheral edges of the surface so that heat flows from such edges toward the center of the surface to enhance the maintenance of a substantially uniform temperature throughout.

*Cross reference to related applications*

This application relates in part and is a continuation in part to copending application Ser. No. 557,493 filed June 14, 1966, now Patent No. 3,368,604, and to copending application Ser. No. 620,001 filed Mar. 2, 1967.

*Background of the invention*

A number of types of cooking apparatus are known in the art wherein heating arrangements are utilized to maintain a substantially uniform temperature throughout the cooking surface. Such past types of cooking apparatus have included arrangements which either provide a plurality of individual spaced heating sources, each individual heating source having a separate heat distribution system cooperating directly with one of several segments of a cooking surface to be heated—as is known in gas cooking—or have included a unitary heat source having a coil distribution system arrangement in a configuration cooperating directly with the entire cooking surface to be heated—such as is known in electrical cooking. The present invention recognizes that such past arrangements do not readily lend themselves to efficient and economic utilization in liquid-fired cooking apparatus since the temperatures of the gases which are emitted from liquid fuel-burning sources are generally greatly in excess of the desirable temperature range for food cooking. Furthermore, the complexity and weight of basic and auxiliary equipment required for either multiple heat source arrangements or for direct heating coil-type arrangement make such systems prohibitive.

*Summary of the invention*

The present invention provides a new, useful, and unobvious liquid-fired cooking arrangement which has particular adaptability for portable field use, the apparatus of the present invention being straightforward in construction, operation, and maintenance, and yet enhancing the obtaining of uniformity of temperatures over the cooking surfaces heretofore identified only with natural gas or electric cooking apparatus. Further, the arrangement of the present invention requires only a minimum of control and a minimum of equipment, accommodating for the generally high temperature operating levels of liquid fuel apparatus to deliver uniform temperatures in desirably lower food cooking ranges. In addition, the present invention provides a liquid fuel cooking apparatus which is comparatively compact in volume and comparatively low in weight.

Various other features of the present invention will become obvious to one skilled in the art upon reading the disclosure set forth hereinafter.

More particularly, the present invention provides a cooking apparatus comprising: a housing having spaced opposed end walls and an encompassing peripheral side wall extending therebetween to define a hot gas chamber with the surface of one of the end wall members serving as a cooking surface to transfer heat from the hot gas chamber to an article of food to be cooked; gas inlet means disposed at one extremity of the housing to permit introduction of hot gas into the chamber; liquid fuel burning combustor means cooperating with the gas inlet means to emit hot gases into the chamber to provide heat; gas outlet means in the housing to discharge waste gas in the chamber; and gas distribution means disposed in the chamber to apply heat along the peripheral edges of the end walls serving as a cooking surface so that heat flows from the peripheral edges toward the center of the surface to enhance the maintenance of a substantially uniform temperature throughout the surface.

It is to be understood that various changes can be made in the arrangement, form, and construction of the apparatus disclosed hereinafter without departing from the scope or spirit of the present invention.

Referring to the drawings which disclose one advantageous embodiment of the present invention in one type of cooking apparatus and an adaptation thereof to another type of cooking apparatus:

FIGURE 1 is a partially broken away, isometric view of a cooking apparatus incorporating the novel features of the present invention;

FIGURE 2 is a cross-sectional elevational view taken in a plane passing through line 2—2 of FIGURE 1;

FIGURE 3 is a cross-sectional elevational view of a portion of the apparatus taken in a plane passing through line 3—3 of FIGURE 2;

FIGURE 4 is an enlarged sectional view of liquid fuel-burning combustor which can be used in cooking device in accordance with the present invention;

Figure 5:
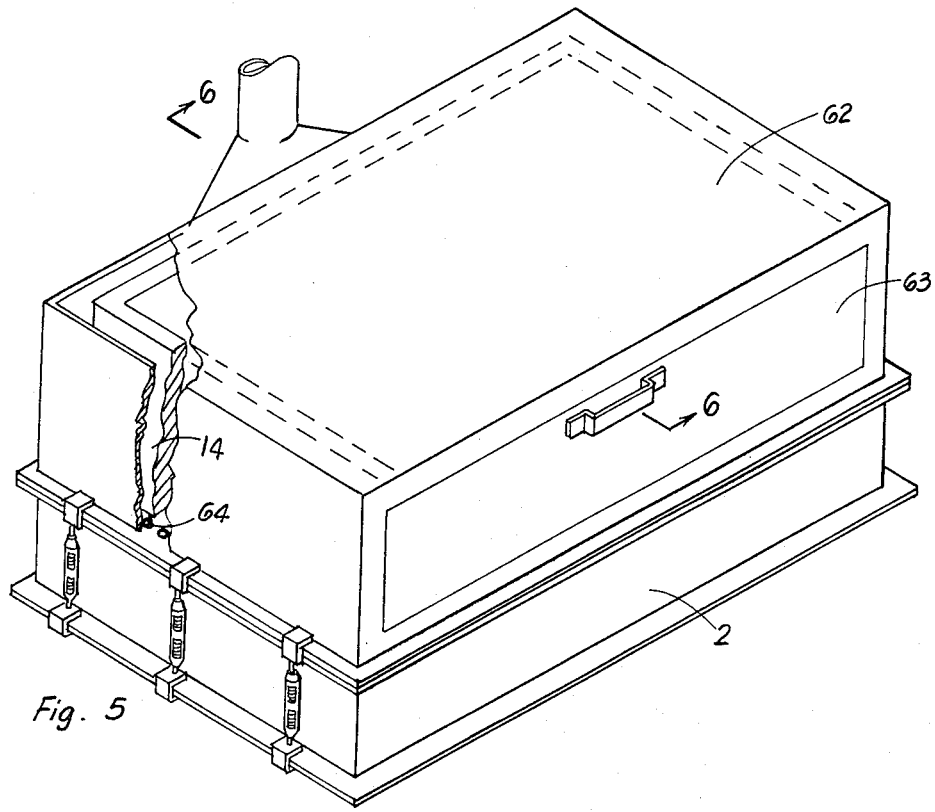
FIGURE 5 is an enlarged, partially broken away isometric view of another type of cooking apparatus which incorporates the novel features of the present invention.

Referring to FIGURE 1 of the drawings, there is disclosed an improved cooking apparatus in the form of housing 2 having spaced opposed upper and lower end walls 3 and 4, respectively, with an encompassing pheripheral side wall 6 extending therebetween, the walls serving to define hot gas chamber 10. As disclosed, housing 2 can be of generally rectangular configuration so that side wall 6 includes four side wall portions with lower end wall 4 and side wall 6 being formed from refractory lined stainless steel plate of suitably selected thickness. Upper wall 3 of housing 2, which in the disclosed embodiment of FIGURES 1 to 3 serves as a cooking surface in the form of a griddle, can be formed as a one-piece grill plate from a stainless steel sheet as shown, or it can include a stainless steel border frame having welded thereto a suitable metallic grill plate. The metallic grill plate can be fabricated from any one of several heat-conductive metals to include a coating material such as Teflon, known in the food cooking art as having non-adhesive properties. As can be seen in FIGURE 1, upper end wall 3 is positioned in faced relationship to one of two border flanges 9 which extend normally from side wall 6. Suitable spaced turnbuckle clamps 11, each having one hook portion engaging with the upper surface of wall 3 and the other hook portion engaging with the lower flange, serve to maintain end wall 3 in fast position and to permit application of selective pressures to reduce the possibilities of heat warp.

Disposed in one side wall portion of generally rectangular side wall 6 substantially midway between the extremities of said side wall portion is gas inlet 12. Gas inlet 12 is arranged to communicate with enclosed header channel 13, which channel extends normally from the side wall portion containing gas inlet 12 through hot gas chamber 10 to an area adjacent the opposite side wall portion substantially midway between the ends thereof. A pair of peripherally disposed branch channels 14 are each communicably connected at one end to enclosed header channel 13 at the area where the enclosed header channel terminates. Branch channels 14 extend in encompassing fashion along the side walls 6 of the chamber, the branch channels connecting together at an area 15 adjacent gas inlet 12. It is to be noted that branch channels 14 can be formed by means of a suitable generally rectangular partition of refractory material 16 which is disposed within generally rectangular encompassing wall 6 so as to be in spaced relation therefrom to provide such branch channels, the portion of hot gas chamber 10 within rectangular partition 16 in turn being bisected by header channel 13. It further is to be noted that header channel 13 is of the same elevation as the side portions of partition 16 against which its ends abut and that the other side portions of partition 16 are of an elevation substantially equal to that of the elevation of encompassing wall 6. It also is to be noted that although header channel 13 is an enclosed channel, branch channels 14 with which it communicates are open at the upper portions thereof. Accordingly, when stainless steel plate constituting upper end wall 3 is positioned in faced relationship to upper border flange 9, gases flowing through branch channels 14 directly contact the peripheral edges of the plate. Since those side portions of partition 16 abutted by the ends of header channel 13 are of the same elevation as the header channel and of less elevation than wall 6, opposite passages 17 and 18 are formed between the opposite portions of partition 16 at the areas of lesser elevation and the bottom of upper end wall 3. One of the opposite passages, passage 17, is located at area 15 adjacent gas inlet 12 (FIGURE 2). This passage 17 communicates with the spaces of hot gas chamber 10 between the branch channels 14 and enclosed header channel 13, and thus, in effect, permits the hot gases to flow under the central portion of the cooking surface as disclosed by the flow lines in FIGURES 1 and 2. The other passage 18 is bounded along its lower side by stainless steel metallic plate 19 which covers the upper portion of branch channel 14 at the area where the branch channels connect with header channel 13. Passage 18 receives hot gases from the interim spaces between the header channel 13 and branch channels and passes them to stack outlet 21.

It is to be understood that in one advantageous embodiment of the present invention, it is possible to provide the channel forming partition 16 with appropriate passage defining recesses as an integral part of the stainless steel plate forming upper end wall 3. With such an arrangement it only would be necessary to place the steel plate in faced relation to upper flange 9 with the integral partition extending into chamber 10 defined by enclosing wall 6 to obtain the necessary channel arrangement aforedescribed.

Referring to FIGURE 4 of the drawings, details of a liquid fuel combustor apparatus 26 which can be associated with gas inlet 12 are disclosed. Combustor 26 can be any one of several known types of liquid-fuel combustors, and advantageously, a combustor apparatus like that disclosed in copending application Ser. No. 557,493 can be utilized along with a cooking surface temperature control arrangement such as disclosed in copending application Ser. No. 620,001.

Combustor 26 as can be seen in FIGURE 4 of the drawings includes outer casing 27 having an annular inlet 28 and an outlet 29, the casing being adapted to receive at least two combustion chambers 31 and 32. Combustion chambers 31 and 32 are defined by perforated cylindrical inner casings 34 and 35, respectively, and the chambers 31 and 32 are disposed in casing 27 in longitudinally aligned relation with outlet 29 of casing 27. A perforated cylindrical casing 36 having a diameter greater than the diameter of casing 34 is disposed in longitudinally aligned, surrounding relation with casing 34 so an annular chamber 37 is formed between casing 36 and casing 27 and a second annular chamber 38 is formed between casing 36 and 34. Casing 27 includes web means 39 adjacent inlet 28 which extend from casing 36 to casing 27 to hold one end of casing 36 in position.

A perforated cap means 41 is adapted to be fitted on one end of casing 34 and receive fuel spray nozzle 43 as shown, while a second cap 44 is provided to be fixed to casing 36 to hold cap 41 in aligned relationship with chamber 31. A perforated plate 46 is disposed generally transversely across casing 34 adjacent nozzle 43 so that a spray 47 of fuel emanating from nozzle 43 passes through a central orifice of plate 46 and is sprayed into casing 31.

Combustion chamber supports 48 and 49 are provided and are adapted to hold ends of casings 34, 36, and 35 in aligned cooperative relation in casing 27. It will be noted support 49 includes a central restrictive orifice 49a and that the area of orifice 49a is advantageously less than the area of chamber 31. Support 49 is fixed in casing 27 so orifice 49a is positioned in generally aligned relation with both chambers 31 and 32 to provide an opening therebetween for the flow of gas from chamber 31 to chamber 32. Support block 48 includes a central orifice 51 to communicate with outlet 29 of casing 27 and provide a gas flow outlet from chamber 32. Support 49 is maintained in casing 27 by means of radially extending webs 52 and is adapted to provide air passages between the webs to permit air flow from annular chamber 37 to annular chamber 53 defined between casings 35 and 27.

In operation, fuel is provided to nozzle 43 through conduit 54 from a source (not shown) at a relatively constant rate, and as hereinbefore described, the fuel is sprayed through central opening of perforated plate 46 into chamber 31. Combustion air enters casing 27 through inlet 28 and a portion flows to chamber 31 through ports 36a of casing 36 and ports 34a of casing 34. The portion of the combustion air which is not supplied to chamber 31 passes through the passages between webs 52 of support block 49 to annular chamber 53 and then into chamber 32 through openings 35a of casing 35. The relative quantities of air introduced into chambers 31 and 32 varies with the pressure in chamber 31, as more fully described in my copending application as hereinbefore noted.

Briefly, as the pressure in chamber 31 is increased, for example in response to increased combustion temperature, the pressure differential between chamber 31 and 38 is decreased so less air is introduced to chamber 31 and more air flows to chamber 53. The increased pressure in chamber 31 increases the velocity of gas flow through restrictive orifice 49a providing a venturi effect at the outlet of orifice 49a to reduce the pressure at the inlet to chamber 32 so additional combustion air is drawn from chamber 53 to chamber 32 through openings 35a of casing 35. It has been found that, at a constant fuel supply rate, operation of the combustor as shown in FIGURE 4 is relatively unaffected by an increase in the quantity of combustion air introduced through inlet 28 because the increased air flow is balanced between chambers 31 and 32 in proportion to the flow resistance encountered by the air stream passing to the different chambers. Since the resistance encountered by the air stream passing from chamber 37 to chamber 31 is greater than the air flow resistance encountered between chambers 37 and 32, and since increased gas flow through chamber 31 decreases the pressure in chamber 32 to draw additional combustion air to chamber 32, most of the extra air flow is received by chamber 32 and very little goes to chamber 31. It will be further noted that by controlling the flow of air to chamber 31, the temperature in the chamber is relatively constant so problems such as carbon deposition and smoking associated with incomplete combustion which result from the cooling effect of excess air normally encountered in previous combustion chambers are eliminated.

It is to be understood that in the invention disclosed herein, the temperature of the cooking surface of upper end wall 3 can be maintained within selected limits by regulating the quantity of ambient air mixed with the products of combustion emitted from the heat source in a manner as disclosed in detail in copending application Ser. No. 620,001. A blower 55 driven by a variable speed motor can be associated with stack outlet 21, or alternatively, with gas inlet 12. A temperature responsive speed controller 57 is included in power source 59 to regulate the speed of blower 55 to control the quantity of air drawn through inlet 12 to combustor 26 and the quantity of tempering air supplied to hot gas chamber 10. The temperature at the surface of end wall 3 is sensed by thermal element 58 and transmitted to controller 57 which can be, for example, a rheostat to regulate the power supply to blower 55 and the speed of blower 55 in accordance with the temperature of the cooking surface of end wall 3. For example, when the temperature of end wall 3 is increased above the desired temperature, the speed of blower 55 is increased to draw additional tempering air through gas inlet 12, and when the surface is below the desired temperature, the speed of blower 55 is decreased so less tempering air is provided to be mixed with products of combustion from combustor 26.

The products of combustion and the tempering air forming the hot gases pass from gas inlet 12 into enclosed header channel 13. From header channel 13 they pass along the peripheral branch channels 14. Since the upper portions of branch channel 14 are open and in direct contact with the peripheral edges of upper end wall 3, the products of combustion directly heat such peripheral edges of upper wall 3 with the heat flowing from such edges toward the central portion of the cooking surface of wall 3. The hot gases continue in their flow path from branch channels 14 through passage 17 adjacent area 15 into the spaces of chamber 10 between branch channels 14 and header channel 15 to pass heat to the central portion of upper wall 3. The gases then proceed to passage 18 over branch channel cover plate 19 to pass to gas outlet stack 21.

Figure 6:
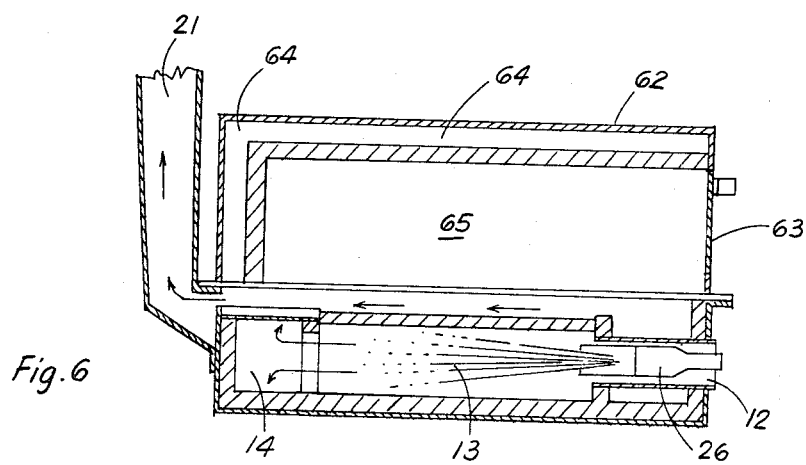
FIGURE 6 is a cross-sectional view of the apparatus of FIGURE 5 taken in a plane passing through line 5—5 of FIGURE 5.

Referring to FIGURES 5 and 6 of the drawings, still another embodiment of the present invention is disclosed wherein housing 62 having access door 63 is provided. Housing 62 is constructed to include hollow walls which provide gas passages 64, the housing 62 being so sized that passages 64 are in communication with the upper openings in branch channels 14 of housing 2 so that hot gases can flow along the branch channels 14 in the manner aforedescribed and also into the passages 64 to provide a heated oven chamber 65 for cooking purposes.

The invention claimed is:

1. A cooking apparatus comprising a housing having spaced opposed end walls and an encompassing peripheral side wall extending therebetween to define a hot gas chamber with the surface of one of said end wall members serving as a cooking surface to transfer heat from said hot gas chamber to an article of food to be cooked; gas inlet means disposed at one extremity of said housing to permit introduction of hot gases into said chamber; liquid fuel burning combustor means cooperating with said gas inlet means to emit hot gases into said chamber to provide heat; gas outlet means in said housing to discharge waste gas from said chamber; and gas distribution means disposed in said chamber to initially apply the heat of the hot gases introduced into said chamber along the peripheral edges of said end wall serving as a cooking surface and to subsequently apply the remaining heat of said hot gases along the central portion of said end wall surrounded by said peripheral edges so that heat flows from the peripheral edges toward the center of said surface to enhance the maintenance of substantially uniform temperatures throughout said surface.

2. The apparatus of claim 1, blower means to provide tempering air through said gas inlet means; and temperature responsive control means cooperating with said blower means to regulate the rate of delivery of tempering air in response to change in temperature at said cooking surface.

3. The apparatus of claim 1, and adjustable pressure means cooperating with said end wall serving as a cooking surface to permit the control of heat warp.

4. The apparatus of claim 1, said gas distribution means comprising an enclosed header channel communicably connected to said gas inlet means and extending through said hot gas chamber intermediate opposed portions of said peripheral side wall to an opposite extremity of said chamber; and a pair of branch channels each communicably connected at one end to said enclosed channel end opposite said gas inlet, said branch channels extending along said peripheral side wall of said chamber and having open portions therein in communication with the peripheral edge of the cooking surface of said housing.

5. The apparatus of claim 1, and a second housing extending from one of said end walls of said first housing, said second housing having hollow oven chamber defining walls in communication with said gas distribution means to receive hot gases therefrom.

6. The apparatus of claim 1, said housing being of generally rectangular shape with said gas inlet means being disposed in one side wall thereof substantially midway between the ends of said wall; said gas distribution means comprising an enclosed header channel communicably connected to said gas inlet means and extending normally from said wall through said hot gas chamber to an area adjacent said opposite side wall substantially midway between the ends thereof; a pair of branch channels, each communicably connected at one end to said enclosed header channels at said area and extending in encompassing fashion along said side walls of said chamber, said branch channels connecting together at an area adjacent said gas inlet, and having open portions therein in communication with the peripheral edge of the cooking surface of said housing; said gas outlet means being disposed adjacent said side wall opposite said gas inlet means to be in communication with interior spaces in said chamber between said header channel and said branch channel; said branch channels being communicably connected at the area adjacent said gas inlet with said interim spaces whereby hot gases pass from said branch channels to said gas outlet transmitting further heat along the central portions of said cooking surface.

7. The apparatus of claim 6, said liquid fuel burning combustor means comprising: first combustor housing means defining a first combustor chamber having fuel and air inlet means and outlet means; fuel feeding means adjacent said first combustor housing inlet means to provide fuel to said first combustor chamber; fuel ignition means; first combustor housing air supply means to provide combustion air to said first combustor chamber; orifice means having an aperture smaller than said first combustor chamber outlet disposed in axial alignment and communicative relation with said first combustor housing outlet to receive combustion gases from said first combustor chamber; second combustor housing means defining a second combustor chamber having an inlet disposed in axial alignment and communicative relation with said orifice means to receive combustion products from said orifice means and a second combustor housing outlet for emission of combustion products from said second combustor chamber; second combustor housing air supply means to provide combustion air to said second chamber; and primary combustion air chamber means communicating with said first combustor housing air supply means and said second combustor housing air supply means to provide combustion air to said first and second combustor chambers so air flow is apportioned between said combustor chambers in accordance with pressure in said first and second combustor chambers.

References Cited
UNITED STATES PATENTS

| | | | |
|---|---|---|---|
| 2,227,923 | 1/1941 | Breese et al. | 126—44 |
| 2,295,889 | 9/1942 | Bufton | 126—44 |
| 3,266,483 | 8/1966 | Keel | 126—275 |

FREDERICK L. MATTESON, Jr., *Primary Examiner.*

E. G. FAVORS, *Assistant Examiner.*